US012517053B2

(12) United States Patent
Bourg et al.

(10) Patent No.: US 12,517,053 B2
(45) Date of Patent: Jan. 6, 2026

(54) APPARATUS FOR LOCALIZING SINGLE FLUORESCENT MOLECULES COMPRISED IN A SAMPLE USING SINGLE MOLECULE LOCALIZATION MICROSCOPY

(71) Applicant: ABBELIGHT, Cachan (FR)

(72) Inventors: Nicolas Bourg, Cachan (FR); Valentina Caorsi, Cachan (FR)

(73) Assignee: ABBELIGHT, Cachan (FR)

( * ) Notice: Subject to any disclaimer, the term of this patent is extended or adjusted under 35 U.S.C. 154(b) by 107 days.

(21) Appl. No.: 18/694,395

(22) PCT Filed: Sep. 28, 2022

(86) PCT No.: PCT/EP2022/076901
§ 371 (c)(1),
(2) Date: Mar. 21, 2024

(87) PCT Pub. No.: WO2023/052384
PCT Pub. Date: Apr. 6, 2023

(65) Prior Publication Data
US 2024/0393250 A1    Nov. 28, 2024

(30) Foreign Application Priority Data

Oct. 1, 2021 (EP) .................... 21306377

(51) Int. Cl.
*G01N 21/64* (2006.01)
(52) U.S. Cl.
CPC ..... *G01N 21/6458* (2013.01); *G01N 21/6408* (2013.01); *G01N 2201/105* (2013.01)

(58) Field of Classification Search
CPC .......... G01N 21/6458; G01N 21/6408; G01N 2201/105
See application file for complete search history.

(56) References Cited

U.S. PATENT DOCUMENTS

2018/0088048 A1* 3/2018 Dong ................. G01N 33/5302
2021/0053824 A1* 2/2021 Chien .................... B82Y 30/00

OTHER PUBLICATIONS

Mau, et al., "Fast widefield scan provides tunable and uniform illumination optimizing super-resolution microscopy on large fields", Nature Communications, 2021.

(Continued)

*Primary Examiner* — Tony Ko
(74) *Attorney, Agent, or Firm* — BakerHostetler (57) ABSTRACT

An apparatus for localizing single fluorescent molecules comprised in a sample using single molecule localization microscopy. The apparatus comprises a scanning unit configured to scan the sample using a light beam at a first wavelength having a predetermined irradiance, an image acquisition unit configured to acquire a first image and a second image at a second wavelength, a localization unit configured to localize the single fluorescent molecules in the second image. Additionally, the apparatus comprises a determination unit configured to determine, based on the first image, one or more local densities of the single fluorescent molecules; and a calculation unit configured to calculate one or more local irradiances of the light beam as a predetermined function of each one of the one or more local densities of the single fluorescent molecules. The scanning unit is further configured to scan the sample using the one or more local irradiances of the light beam.

13 Claims, 4 Drawing Sheets

(56) References Cited

OTHER PUBLICATIONS

Stefko, et al., "Autonomous illumination control for localization microscopy", Optics Express, vol. 26, Issue 23, pp. 30882-30900, 2018.
Kechkar, et al., "Real-Time Analysis and Visualization for Single-Molecule Based Super-Resolution Microscopy", PLoS One, 8(4), p. e62918, 2013.
Extended European Search Report issued in European Patent Application No. 21306377.9, mailed Mar. 17, 2022.
Mailfert, et al., "Theoretical High-Density Nanoscopy Study Leads to the Design of UNLOC, a Parameter-free Algorithm", Biophysical Journal, vol. 115, Issue 3, pp. 565-576, 2018.
Lelek, et. al., "Single-molecule localization microscopy", Nature Reviews Method Primers, vol. 1, 39, 2021.
Von Diezmann, et al., "Three-Dimensional Localization of Single Molecules for Super-Resolution Imaging and Single-Particle Tracking", Chemical Reviews, vol. 117, 11, 2017.

\* cited by examiner

APPARATUS FOR LOCALIZING SINGLE FLUORESCENT MOLECULES COMPRISED IN A SAMPLE USING SINGLE MOLECULE LOCALIZATION MICROSCOPY

CROSS-REFERENCE TO RELATED APPLICATIONS

This application is a National Stage of International patent application PCT/EP2022/076901, filed on Sep. 28, 2022, which claims priority to foreign European patent application No. EP 21306377.9, filed on Oct. 1, 2021, the disclosures of which are incorporated by reference in their entireties.

TECHNICAL FIELD

The present invention relates to a method and apparatus for localizing single fluorescent molecules using single molecule localization microscopy.

BACKGROUND

Single molecule localization microscopy (SMLM) is based on the delayed stochastic emission of molecules in order to achieve the emission of single fluorescent molecules. A sample containing fluorescent molecules is illuminated using an irradiance tuned in such a way that, on average, at each time there is only one active (i.e. emitting) molecule in a focal volume of an observing microscope. Images acquired by SMLM present image spots called point spread functions (PSFs), and each spot represents the image of a molecule. From a PSF, it is possible to measure the position of a molecule by determining the center of the spot using an algorithm. This position can be determined with a precision which can be much better than the diffraction-limited resolution of the microscope. This stochastic process is repeated for several tens of thousands of images to obtain a final super-resolved image with a high spatial resolution (up to 10 nm). For example, Lelek et. al[1] describes the basic principles of SMLM, such as the different types of molecule labelling, the determination of the position of PSFs and the process to reconstruct super-resolution images from localizations of PSFs.

Additionally, Mailfert et. al[2] discloses algorithms used for determining PSFs. In particular, Mailfert et. al relates to an algorithm which has been optimized to obtain higher spatial resolution for samples having a high density of fluorescent molecules. In particular, the algorithm evaluates the probability of detection and the uncertainty of localization for each fluorescent molecule so that imprecise localizations can be filtered out when reconstructing super-resolution images.

However, the high spatial resolution depends on the molecule detection which in turn depends on the density of single fluorescent molecules. In particular, the higher the density, the more difficult it is to detect and localize molecules and the lower the image quality (due to artefacts such as sample drifting and overlapping PSFs). In contrast, the lower the density of single fluorescent molecules, the higher the spatial resolution.

Further, most SMLM techniques use a Gaussian-shaped illumination to illuminate samples. However, Gaussian-shaped illumination provides a non-uniform excitation and limits the exploitable fields of view. Mau et. al[3], discloses a method for achieving a uniform illumination. The system is called ASTER (Adaptable Scanning for Tunable Excitation Regions) which comprises a laser source having a Gaussian beam. The Gaussian beam is focalized on two galvanometer scanning mirrors to control illumination at the sample plane. While the excitation beam keeps its position in the back focal plane, an angular rotation of a galvanometer induces a similar angle in the back focal plane, corresponding to a different position in the sample plane. By applying specific patterns, such as raster scanning, the ASTER system can provide uniform excitation on tunable fields of view. The system of Mau et. al enables an increased precision of the determination of the center of PSFs, wider fields of view and greater efficiency compared to systems using conventional Gaussian-shaped illumination, which provide a non-uniform excitation.

However, most biological samples comprise a heterogenic density of molecules. Therefore, by using a uniform illumination, such as the system used in Mau et. al, high spatial resolution may be achieved in certain regions of a sample, while low spatial resolution may be achieved in other regions of the same sample. For example, regions of sample having a high density of fluorescent molecules may present more artefacts than regions having a lower density of fluorescent molecules.

As disclosed in Mailfert et. al, algorithms have been developed to adapt the localization according to the density and determine the center of PSFs for samples with a high molecule density. However, the spatial resolution obtained from algorithms which adapt the localization according to the density is still lower for high density than for low density.

BRIEF SUMMARY OF THE INVENTION

These problems are solved or mitigated by the claimed apparatus and method.

Instead of using a uniform illumination and using an optimized algorithm for localizing single fluorescent molecules, according to the present invention the irradiance of the illuminating light beam is adapted to the density of the fluorescent molecules of a sample. Therefore, for a sample comprising low molecule density and high molecule density regions, the irradiance used to localize the molecules in the low density region will be lower than that used localize the molecules in the high density region. According to an advantageous embodiment, the irradiance is adapted to the molecule density by changing the diameter of the illuminating light beam, which enables optimizing the scanning efficiency.

A first aspect of the invention provides an apparatus for localizing single fluorescent molecules comprised in a sample using single molecule localization microscopy, the apparatus comprising: a scanning unit configured to scan the sample using a light beam at a first wavelength having a predetermined irradiance; an image acquisition unit configured to acquire a first image and a second image at a second wavelength; a localization unit configured to localize the single fluorescent molecules in the second image; characterized in that the apparatus comprises: a determination unit configured to determine, based on the first image, one or more local densities of the single fluorescent molecules; and a calculation unit configured to calculate one or more local irradiances of the light beam as a predetermined function of each one of the one or more local densities of the single fluorescent molecules, wherein the scanning unit is further configured to scan the sample using the one or more local irradiances of the light beam.

Optionally, the one or more local irradiances of the light beam are adapted so that, in average, only one of the single fluorescent molecules emits in a given time frame in a given focal volume.

Optionally, the apparatus is configured to perform a series of successive processes for localizing the single fluorescent molecules, wherein, for each successive process, the second image becomes the first image of the successive process.

Optionally, the calculation unit is configured to calculate the one or more local irradiances based on a look-up table in which local irradiance values are associated with local density of fluorescent molecules values.

Optionally, the scanning unit comprises a zoom for varying the local irradiance of the light beam by varying its diameter.

Optionally, the determination unit is configured to determine a trajectory of the light beam, and the scanning unit is configured to scan the sample based on the trajectory, wherein the trajectory includes regions of the sample comprising the single fluorescent molecules and avoids regions of the sample which do not comprise the single fluorescent molecules.

A second aspect of the invention provides a method of localizing single fluorescent molecules comprised in a sample using single molecule localization microscopy, the method comprising: a) scanning the sample using a light beam at a first wavelength having a predetermined irradiance, said first wavelength being an excitation wavelength of said fluorescent molecules; b) acquiring a first image at a second wavelength, said second wavelength being an emission wavelength of said fluorescent molecules; determining, based on the first image, one or more local densities of the single fluorescent molecules; d) calculating, one or more local irradiances of the light beam as a predetermined function of each one of the one or more local densities of the single fluorescent molecules; d) scanning the sample using the one or more local irradiances of the light beam; f) acquiring a second image at the second wavelength; and g) localizing the single fluorescent molecules in the second image.

Optionally, the one or more local irradiances of the light beam are adapted so that, in average, only one of the single fluorescent molecules emits in a given time frame in a given focal volume.

Optionally, wherein the steps c) to g) are performed successively multiple times and wherein the second image becomes the first image of step c) and successive second images are obtained each successive time the steps are performed.

Optionally, the one or more local irradiances are calculated based on a look-up table in which local irradiance values are associated with local density of fluorescent molecules values.

Optionally, scanning the sample using the one or more local irradiances of the light beam includes varying the local irradiance of the light beam by varying its diameter.

Optionally, the method comprises determining a trajectory of the light beam and scanning the sample based on the trajectory, wherein the trajectory includes regions of the sample comprising the single fluorescent molecules and avoids regions of the sample which do not comprise the single fluorescent molecules.

Optionally, the method further comprises reconstructing a final image of the single fluorescent molecules based on the localization of the single the single fluorescent molecules in the second image and the each successive second image.

BRIEF DESCRIPTION OF THE DRAWINGS

Embodiments of the invention will now be described with reference to the accompanying drawings, in which.

DETAILED DESCRIPTION

Figure 1:
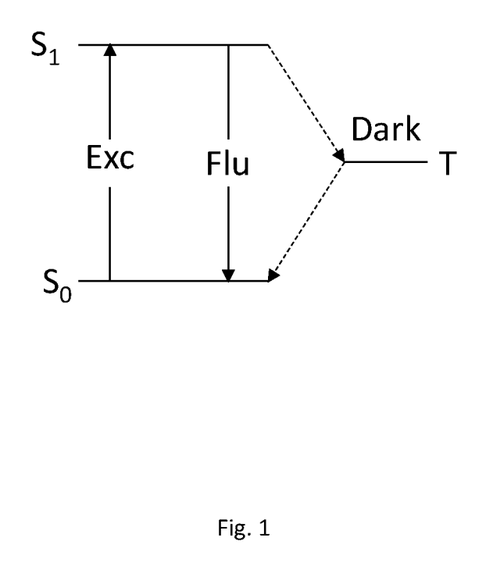
FIG. 1 is a state diagram of a fluorescent molecule, according to an example.

As shown in FIG. 1, fluorescent molecules are initially in a ground state $S_0$ (usually a singlet). They may absorb a photon at an excitation wavelength and reach an excited state $S_1$ (also of singlet multiplicity). An excited molecule can then return to its ground state by emitting a fluorescence photon or, with a much lower probability, undergo a non-radiative transition to a "dark" triplet state T where it remains for a comparatively long time (of the order of milliseconds to seconds). Return from the dark state to the ground state can be accelerated by light.

When a sample labelled with fluorescent molecules is illuminated at the excitation wavelength, it initially emits an intense fluorescence radiation. After some time, however, all the molecules are virtually "trapped" in the dark state and are therefore "turned OFF". At that point, fluorescent emission only occurs intermittently ("blinking") when some molecules return to the ground state and emit again (are "turned ON") before turning off again.

In SMLM, image acquisition is performed in this blinking regime, after the initial intense emission transitory phase.

According to the invention, and to the ASTER technique, the illuminating beam is scanned, therefore a given region of the sample is only illuminated for a short time (between 50 μs and 500 μs). In order for the blinking regime to be achieved, a sufficient number of photons must reach the region of the sample within the illumination time, therefore the irradiance must be sufficiently high. This number of photons (or, equivalently, irradiance value) is dependent on the number of fluorescent molecules in the region of the sample. If the irradiance is too low, there will not be enough photons to turn all the molecules off and the single-molecule condition will not be achieved. However, this same irradiance may be sufficient in a region of the sample containing fewer fluorescent molecules. In the present inventive method, irradiance is adapted to the local molecule density in order to achieve optimal resolution over the whole sample, despite an inhomogeneous density of fluorescent molecules.

Figure 2:
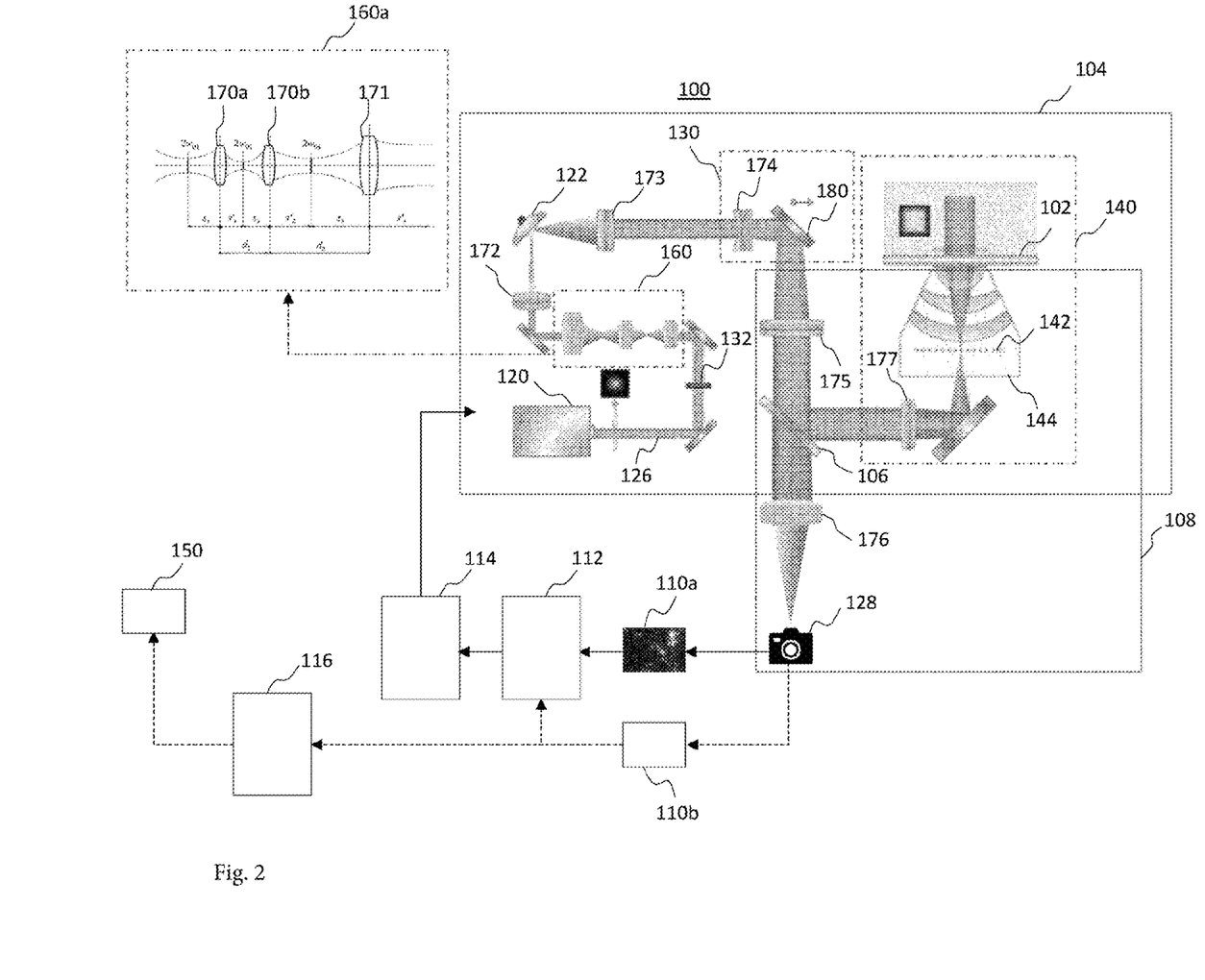
FIG. 2 is a schematic of an apparatus for localizing single fluorescent molecules, according to an example.

FIG. 2 is a schematic diagram of an apparatus 100 for localizing single fluorescent molecules comprised in a sample 102 using single molecule localization microscopy (SMLM), according to an example.

The sample 102 may be made of, for example, cell (such as neurons) or tissue samples comprising molecules which have been fluorescently labeled. For example, the fluorescent molecules may have been labelled using SMLM fluorophores such as photoswitchable, photoactivable, photoconvertible, spontaneously blinking or temporarily blinking fluorophores. That way, once labelled, the fluorescent molecules undergo reversible transitions between ON and OFF emission states (i.e. blink) when being under illumination. In general, samples comprising fluorescent molecules have a heterogeneous density of fluorescent molecules. Therefore, regions of the sample 102 may have a high density of fluorescent molecules while other regions may have a low density of fluorescent molecules. Additionally or alternatively, other regions may have no fluorescent molecules.

As illustrated in FIG. 2, the apparatus 100 comprises a scanning unit 104, an image acquisition unit 108, a determination unit 112, a calculation unit 114 and a localization unit 116. Each of the determination unit 112, calculation unit 114 and localization unit 116 may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. When a hardware device is a computer processing device (e.g. CPU, a controller, an ALU, a digital signal processor, a microcomputer, a microprocessor, etc.), the computer processing device may be configured to carry out program code by performing arithmetical, logical, and input/output operations, according to the program code. Each unit may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media.

Alternatively, two or more units of the determination unit 112, calculation unit 114 and localization unit 116 may be implemented by the same hardware and/or software. For example, all of the determination unit 112, calculation unit 114 and localization unit 116 may be implemented by a single computer storage medium capable of providing instructions to each unit to carry out functions described below.

The scanning unit 104 is configured to scan the sample 102 using a light beam 126 at a first wavelength having a predetermined irradiance. In an example, the scanning unit may be the Adaptable Scanning for Tunable Excitation Regions (ASTER) system disclosed in Mau et. al. The ASTER system 104 enables to obtain a uniform excitation while using a Gaussian beam.

As illustrated in FIG. 2, the ASTER system 104 comprises a laser 120 emitting the light beam 126 having a Gaussian-shaped illumination profile. The laser emits at the first wavelength which corresponds to the excitation wavelength of the fluorophores which have been used to label the molecules comprised in the sample 102. For example, the laser 120 may be a diode-pumped solid-state laser emitting at 638 nm.

An excitation filter 132 is used for selecting the excitation wavelength of the laser 120. In this example, the Aster system 104 comprises multiple mirrors for practicability and compactness of the system. Further the Aster system 104 comprises a variable afocal system 160 which can be used as an optical zoom to change the diameter of the light beam 126. Details of the variable afocal system 160 are shown in the inset 160a of FIG. 2. The variable afocal system 160 comprises two variable focus liquid lenses 170a, 170b having focal lengths which can vary between −28 mm and 28 mm and one fixed positive lens 171 having a focal length $f_3$ of 100 mm. By changing the focal lengths $f_1$; $f_2$ of the lenses 170a, 170b, it is possible to vary the diameter of the light beam 126 and obtain a diameter between 0.1 and 10 times the initial diameter of the light beam 126.

Additionally, the ASTER system 104 comprises a microscope 140 which comprises an objective 144. The microscope 104 also comprises a tube lens 177 having a focal length of 200 mm so that the light beam 126 is focused on the back focal plane 142 of the objective 144 of the microscope 144. The microscope 140 may be, for example, an inverted microscope. The microscope is part of both the ASTER system 104 (i.e. scanning unit 104) and the image acquisition unit 108 described below. The sample 102 is placed in the microscope 142, on a coverslip.

Further, the Aster system 104 comprises a galvanometer scanning mirror 122. The galvanometer scanning mirror 122 is controlled by a waveform generator (not shown). While only one galvanometer scanning mirror 122 is shown in FIG. 2 for ease of representation, in reality, two galvanometer scanning mirrors 122 are used. A lens 172 with a focal length of 100 mm is used to focalize the Gaussian light beam 126 (which provides non-uniform excitation as illustrated in FIG. 2) between the two galvanometer scanning mirrors 122 placed in a plane conjugated to the back focal plane 142 of the objective 144 of the microscope 140. In particular, an angle shift applied to the galvanometer scanning mirrors 122 induces a similar angle shift in the back focal plane 142 of the objective 144 and a position shift of the light beam 126 at the sample 102 plane. A lens 173 having a focal length of 100 mm is placed after the two galvanometer scanning mirrors 122. This configuration enables obtaining a collimated beam for scanning large X-Y areas. After focalization of the light beam 126 at the back focal plane 142 of the objective 144, a temporally averaged flat-top excitation profile at the sample 102 is obtained (as illustrated in FIG. 2). Thus, fast scanning of the sample 102 by the Gaussian light beam 126 in defined patterns such as a raster scan or an Archimedes spiral generates an overall homogeneous illumination.

Further, the ASTER system 104 comprises a translation stage 130, such as a motorized translation stage and comprising a dielectric mirror 180. Two fixed lenses 174, 175 having focal lengths of −50 mm and 200 mm, respectively, each one being placed on each side of the dielectric mirror 180, are used to magnify the light beam 126. The translation stage 130 enables to change the polar angle of the light beam 126 at the back focal plane 142 of the objective 144 of the microscope 140.

Therefore, the translation stage 130 can be used to change the excitation from epifluorescence to oblique and total internal reflection fluorescence excitation, which are different schemes used for studying samples with SMLM, each using a different polar angle.

As indicated above, the ASTER system 104 is configured to scan the sample 102 using a light beam 126 at a first wavelength having a predetermined irradiance. The predetermined irradiance may be a low irradiance in order to minimize photobleaching of the fluorescent molecules. For example, the predetermined irradiance may be determined by a user, based on an estimated average density of fluorescent molecules. Alternatively, the predetermined irradiance may be extracted from a look-up table comprising irradiance values associated with an estimated average density of fluorescent molecules and/or the type of molecules and/or fluorophores.

The image acquisition unit 108 of the apparatus 100 is configured to acquire a first image 110a at a second wavelength. As explained above, when being under illumination, fluorescent molecules reach an excited state and then return to a ground state by emitting a photon before being in an excited state again. Alternatively, when fluorescent molecules are being scanned, they can reach a dark state without emission of radiation. In order to be in a single molecule condition, in high density regions, most molecules need to be "OFF" (i.e. trapped in the dark state). Therefore, the image acquisition unit 108 is configured to acquire an image when most fluorescent molecules are "OFF". Since the probability to reach the triplet state is lower than the probability to reach the ground state, there is a delay between the start of a scan and the acquisition of an image. The delay is in a range of a few hundreds of ms to a few seconds. Additionally, after a certain amount of time under illumination, fluorescent molecules will reach an excited state again. Therefore, the image acquisition unit 108 acquires an image before most fluorescent molecules are back "ON". Additionally, the scanning unit 104 will scan another area of the sample before the fluorescent molecules are back "ON". Therefore, the scanning unit 104 scans a region of a sample for a time range of approximately 50 µs to 500 µs.

Figures 3A, 3B:
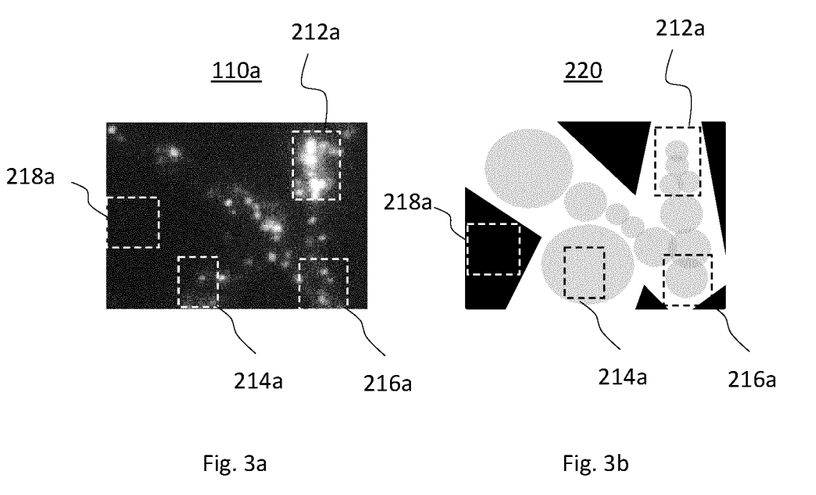
FIG. 3a is an image of fluorescent molecules, according to an example.
FIG. 3b is an image of an irradiance mapping, according to an example.

The image acquisition unit 108 includes a dichroic mirror 106 which is used to separate the excitation wavelength (received from the scanning unit 104) and the emission wavelength (received from the sample 102) so that the emission from the sample 102 can be collected by the image acquisition unit 108. The image acquisition unit 108 comprises a camera 128 (such as a sCMOS camera) which acquires the first image 110 when the sample 102 is being scanned at the predetermined irradiance. The image acquisition unit 108 also comprises a fixed lens 176 having a focal length of 180 mm or 200 mm to focalize the light beam 126 on the camera 128. The second wavelength is the emission wavelength of the fluorophores which have been used to label the molecules of the sample 102. FIG. 3a shows an example of the first image 110a. The first image 110a presents spots, or point spread functions (PSFs), and each PSF represent a single fluorescent molecule. As indicated above, the sample 102 may present a heterogeneous density of fluorescent molecules. FIG. 3a shows that the sample 102 presents high density regions 212a, low density regions 214a, mid density regions 216a and regions with no fluorescent molecules 218a. Therefore, since a single irradiance (the predefined irradiance) is used to scan the sample 102, the irradiance is not optimized for each region of the sample 102. Therefore, the first image 110a presents overlapping PSFs, which are clusters of fluorescent molecules emitting at the same time in a given time frame, in a given focal volume (i.e. the field of view) in regions of the sample 102 having a high density of fluorescent molecules.

The determination unit 112 of the apparatus 100 is configured to determine, based on the first image 110a, one or more local densities of the single fluorescent molecules. In particular, the determination unit 112 determines the density of each region of the sample 102 which are shown in the first image 110a. For example, the determination unit 112 determines a distribution of points (representing PFSs) in the first image 110a. In an example, the determination unit 112 may determine regions of interests which are regions comprising fluorescent molecules (other regions having no fluorescent molecules). For example, as shown in FIG. 3a, the region comprising PSFs (i.e. showing dots) is a region of interest, while the other regions (i.e. dark regions) do not comprise fluorescent molecules. The determination unit 112 may further determine the density of sub-regions of the regions of interest. For example, as illustrated in FIG. 3a, the sub-regions 212a, 214a and 216a are sub-regions of the region of interest of the first image 110a, each having a high, low and mid density of fluorescent molecules, respectively. Based on the determination of the local densities of the each sub-region of the sample 102, the determination unit 102 can determine a trajectory of the light beam 126 of the scanning unit 104. For example, the trajectory may be determine so that it only includes the regions of interest and avoids the regions which do not comprise the fluorescent molecules. For example, the trajectory will avoid the region 218a show in FIG. 3a.

The calculation unit 114 of the apparatus 100 is configured to calculate one or more local irradiances of the light beam 126 as a predetermined function of each one of the one or more local densities of the single fluorescent molecules determined by the determination unit 112. In particular, the calculation unit 114 may receive the determined densities from the determination unit 112 for each sub-region of the regions of interest, and calculate associated irradiance values which can be used to scan each sub-region of the sample 112 (corresponding to the sub-regions of the first image 110a). For example, the calculation unit 112 may calculate irradiances of each sub-region based on a look-up table in which local irradiance values are associated with local density of fluorescent molecules values. Alternatively, the calculation unit may use an analytic function to calculate the irradiance of each sub-region. That way, for sub-regions having low densities of fluorescent molecules, a low irradiance will be calculated. Similarly, for sub-regions having high densities of fluorescent molecules, a high irradiance will be calculated, and for sub-regions having mid densities of fluorescent molecules, a mid irradiance will be calculated. For example, the calculation unit 112 will calculate a high irradiance for the sub-region 212a, a mid irradiance for the sub-region 216a and a low irradiance for the sub-region 214a shown in FIG. 3a.

The scanning unit 104 can then scan the sample 102 by using optimized scanning settings, i.e. based on the local irradiances calculated by the calculation unit 114 and preferably, on the trajectory determined by the determination unit 112. In particular, in order to optimize the scanning time, the scanning unit 104 only scans the regions of interest (and avoids the regions having no fluorescent molecules) while using the irradiance which is associated to each sub-region of the sample 102. In particular, since the diameter of the light beam 126 is larger for a lower irradiance, it is possible to scan a larger area than when using a small light beam 126. Therefore, for the sub-regions having low densities of fluorescent molecules, the scanning unit 104 will scan the sample 102 with the low irradiance calculated by the scanning unit 104. Similarly, for the sub-regions having high densities of fluorescent molecules, the scanning unit 104 will scan the sample 102 with high irradiance, and for the sub-regions having mid densities of fluorescent molecules, the scanning unit 104 will scan the sample 102 with the mid irradiance.

In order to vary the irradiance for scanning the sample 102, the scanning unit 104 varies the diameter of the light beam 126. As indicated above, the ASTER system 104 comprises the variable afocal system 160 which is configured to change the diameter of the light beam 126. To increase the irradiance, the variable afocal system 160 is used to decrease the diameter of the light beam 126, and to decrease the irradiance, the variable afocal system 160 is used increase the diameter of the light beam 126. For example, FIG. 3b illustrates an irradiance mapping 220 used to scan the sample 102, the irradiance having been determined based on the first image 110a of FIG. 3a. A small diameter of the light beam 126 is used to scan the sub-region 212a having a high density of fluorescent molecules, a small diameter of the light beam 126 is used to scan the sub-region 214a having a low density of fluorescent molecules, and a mid-size diameter of the light beam 126 is used to scan the sub-region 216a having a mid density of fluorescent molecules.

While scanning the sample using the optimized scanning settings (i.e. optimized irradiance and trajectory), the image acquisition unit 108 can then acquire a second image 110b. The second image is acquired at the second wavelength. Similar to the first image 110a, the second image presents PSFs. However, since the irradiance was adapted to the density of the each sub-region of the sample 102, the second image presents fewer overlapping PSFs than the first image 110a. In other words, the single fluorescent molecule condition is achieved. In particular, by adapting the irradiance of the scanning unit 104 to the density of fluorescent molecules of each sub-region, clusters of fluorescent molecules emitting at the same time can be avoided, and it is possible to obtain a single fluorescent molecule emitting in a focal volume at a given time. Additionally, by only scanning regions of interest and avoiding regions having no fluorescent molecules as well as using a larger light beam 126 to scan regions having a low density of fluorescent molecules, it is possible to improve the scanning efficiency.

The localization unit 116 of the apparatus 100 is configured to localize the single fluorescent molecules in the second image. The localization unit 116 may be a computer program which extracts an intensity profile for each PSF of the second image in order to localize the single fluorescent molecules. The localization unit 116 may use the single molecule localization method described in von Diezmann[4] to determine the localization of the single fluorescent molecules from the intensity profiles of each PSF. In particular, the localization unit 116 may analyze the PSFs of the second image which fits a Gaussian model to each intensity profile and calculates an estimate of the center of each fluorescent molecule. Since the second image is acquired with the single molecule condition, the second image does not present presents overlapping PSFs, even in regions with a high density of fluorescent molecules. Therefore, it is possible to localize the PSFs precisely.

In order to obtain a final image having a super resolution, the process performed by the apparatus 100 described above may be repeated multiple times. For example, the process may be performed thousands or tens of thousands of times. However, photobleaching causes variations of the density of the fluorescent molecules (due to the alteration of the fluorophores used to label the fluorescent molecules which can engender fading of fluorescence and permanent loss of fluorescence). Therefore, when repeating the process, it may be necessary to adapt the irradiance each time the process of the apparatus 100 described above is repeated. In order to adapt the irradiance, each successive process is performed by using the second image 110b as the first image 110a. In particular, the determination unit 112 determines, based on second image 110b local densities of the single fluorescent molecules. Then, the calculation unit 114 calculates local irradiances of the light beam 126 of the scanning unit 104 as predetermined functions of each local density of the fluorescent molecules determined based on the second image 110b. Further, the scanning unit 104 scans the sample 102 using the irradiances corresponding to the local densities of the fluorescent molecules determined based on the second image 110b. Finally, a third image is acquired by the acquisition unit 108, and the single fluorescent molecules are localized in the third image by the localization unit 116. A successive process may be repeated by using the third image to localize the fluorescent molecules in a fourth image, and so on. Therefore, thousands or tens of thousands of images of the sample 102 may be acquired to localize the single fluorescent molecules. The localizations can then be rendered as a super-resolution image 150 of the single fluorescent molecules. For example, the localization unit may be implemented by a software which localizes single fluorescent molecules in the second image 110b, third image, fourth image, etc. thousandth image. The software may a grid is defined with bin sizes similar to the precision of the localization. In each bin, localizations are counted and translated to pixel intensities, from which the super-resolution image 150 is reconstructed.

Advantageously, the iterative process described above enables adjusting the irradiance after each scan, and not only after the acquisition of the first image. In particular, the irradiance can be adapted after each new image acquired. That way, the precision of the localization of PSFs can be improved since the density is estimated each time a new image is acquired. Since the molecule are not emitting at the same time, measuring the density several times and adapting the irradiance ensures an optimization of the localization of the PSFs. In other words, by using successive processes, the determination of the density is more precise, and therefore, the localization can be optimized.

In another example, the scanning time is the calculation unit 114 is further configured to calculate a scanning time as predetermined function of each one of the one or more local densities of the single fluorescent molecules. Therefore, for each calculated irradiance associated with a local density, a scanning time may be associated. Consequently, the scanning unit may be further configured to scan the sample using the calculated scanning times, each scanning time being associated with an irradiance for each local density. In particular, the higher the density, the shorter the scanning time may be. Inversely, the smaller the density, the longer the scanning time. For example, for local areas having a low density of molecules, a low irradiance is used to scan these areas. The scanning time may be long as it ay take time for molecules to be "ON". In contrast, if the density is greater, it may take a shorter time for molecules to be "ON" since there are more molecules in the sample. In other words, for a same scanning time, for higher densities, the probability of having an emitting molecule is greater than for lower densities.

While the apparatus 100 has been illustrated and described above with the ASTER system as the scanning unit 104, the invention is not limited to the disclosed scanning unit 104. Other scanning units may be used without leaving the scope of protection of the claimed invention.

Figure 4:
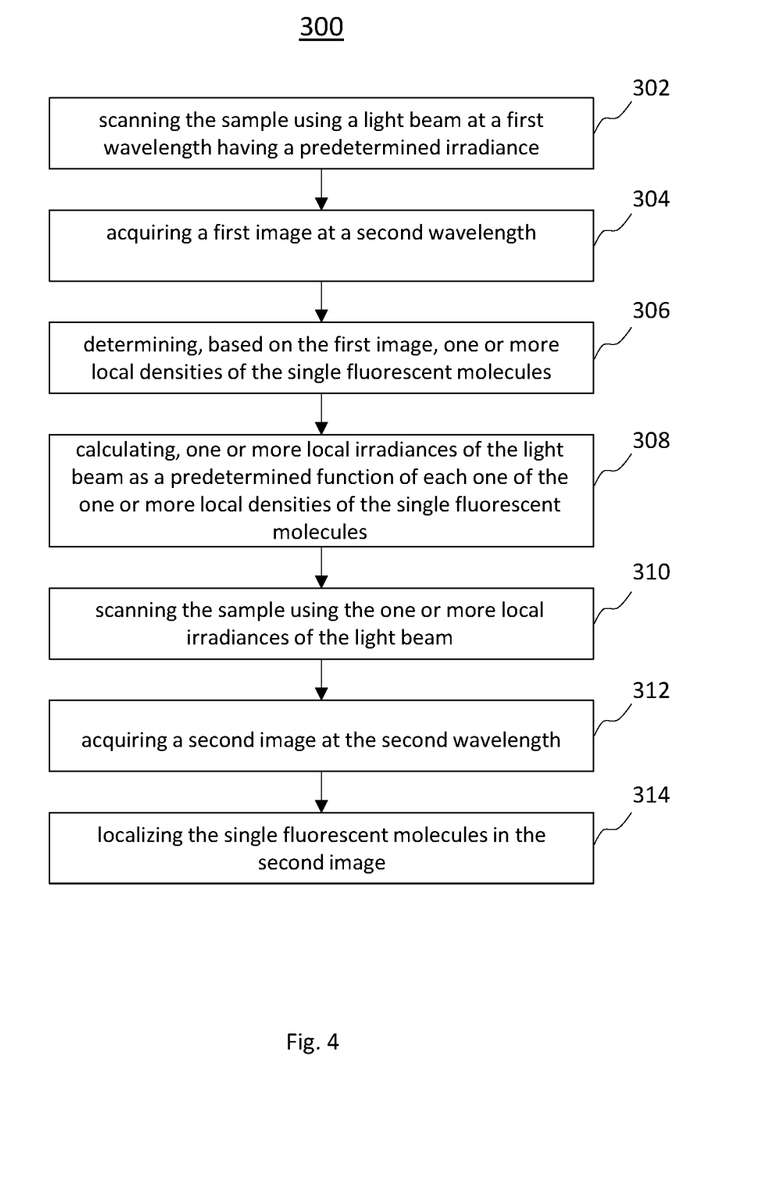
FIG. 4 is a flow diagram of a method of localizing single fluorescent molecules, according to an example.

FIG. 4 is a flow diagram depicting a method 300 of localizing single fluorescent molecules comprised in a sample 102 using single molecule localization microscopy. For example, the method 300 may be implemented by the apparatus 100 described above with reference to FIG. 2.

At block 302, the sample 102 is scanned using a light beam 126 at a first wavelength having a predetermined irradiance, the first wavelength being an excitation wavelength of the fluorescent molecules. In an example, the sample 102 is scanned by the ASTER system 104 described with reference to FIG. 2.

At block 304, a first image 110a is acquired a second wavelength, the second wavelength being an emission wavelength of the fluorescent molecules. The first image 110a is acquired while the sample 102 is being scanned at the first wavelength.

At block 306, one or more local densities of the single fluorescent molecules are determined, based on the first image 110a. For example, the sample 102 may have a heterogeneous density of fluorescent molecules, and, thus, the first image 110a may present regions having high density, low density of fluorescent molecules and/or no fluorescent molecules. In an example, a trajectory of the light beam 126 may be determined. The trajectory includes regions of the sample 102 comprising the single fluorescent molecules and avoids regions of the sample 102 which do not comprise the single fluorescent molecules.

At block 308, one or more local irradiances of the light beam 126 are calculated as a predetermined function of each one of the one or more local densities of the single fluorescent molecules. For example, the one or more local irradiances may be calculated based on a look-up table in which local irradiance values are associated with local density of fluorescent molecules values. The one or more local irradiances of the light beam 126 are calculated in such a way so that, in average, only one of the fluorescent molecules emits in a given time frame (single molecule condition). The single molecule condition enables to prevent the overlapping of PSFs.

At block 310 the sample 102 is scanned using the calculated one or more local irradiances of the light beam 126. For example, regions of the sample 102 having a high density of fluorescent molecules are scanned by using the calculated high irradiance, while regions of the sample 102 having a low density of fluorescent molecules are scanned by using the calculated low irradiance. The sample 102 may be scanned based on the determined trajectory. Therefore, only the regions of the sample 102 comprising fluorescent molecules are scanned. Additionally or alternatively, the one or more local irradiances may be obtained by varying diameter of the light beam 126.

At block 312, a second image 110b is acquired at the second wavelength. The second image 110b is acquired while scanning the sample with using the calculated one or more local irradiances of the light beam 126. Because the irradiance has been optimized, the overlapping PSFs are minimized in second image 110b which presents few artefacts.

At block 314, the single fluorescent molecules are localized in the second image. Since the second image 110b has been acquired in the single molecule condition, it is possible to localize the single fluorescent molecules with high precision.

The method 300 may be performed multiple times in order to obtain a super-resolution image. However, photobleaching causes variations of the density of the single fluorescent molecules. Therefore, the steps at blocks 306 to 314 may be performed successively multiple times, and each time the method is repeated, the second image 110b becomes the first image 110a, and a successive second image is obtained, in which the single fluorescent molecules are localized. Additionally, a final image of the single fluorescent molecules may be reconstructed based on the localization of the single the single fluorescent molecules in the second image and the each successive second image.

According to the method 300 with reference to FIG. 4, instead of using a uniform illumination to scan the sample 102, an illumination which is adapted to the density of fluorescent molecules is used. Consequently, it is possible to achieve the single fluorescent condition, even in high density regions. Therefore; by achieving the single fluorescent molecule condition, it is possible to acquire images with limited artefacts and localize PSFs with high precision while improving scanning efficiency.

While the invention has been illustrated and described in detail with the help of a preferred embodiment, the invention is not limited to the disclosed examples. Other variations can be deducted by those skilled in the art without leaving the scope of protection of the claimed invention. For example, different lenses may be used with different focal lengths. Additionally, variable focus lenses, and in particular, variable focus liquid lenses are not essential, but enable obtaining a fast zoom. In other examples of the present invention, irradiance may be varied by using a variable attenuator or by controlling the light source supply. However, these further methods to vary the irradiance do not enable to optimize the scanning time. In another example, the entire sample may be scanned (e.g. by using a raster scan) instead of scanning only the regions of the sample comprising fluorescent molecules. Further, fluorescent molecules may present a more complex dynamic than that presented in FIG. 1 and may be, for example photoconvertible molecules.

REFERENCES

1. Lelek et. al, Single-molecule localization microscopy, Nature Reviews Method Primers, vol. 1, 39, 2021.
2. Mailfert et. al, A Theoretical High-Density Nanoscopy Study Leads to the Design of UNLOC, vol. 113, 3, 2018.
3. Mau et. al, Fast widefield scan provides tunable and uniform illumination optimizing super-resolution microscopy on large fields, Nature Communications, vol. 12, 3077, 2021.
4. von Diezmann et. al, Three-Dimensional Localization of Single Molecules for Super-Resolution Imaging and Single-Particle Tracking, Chemical Reviews, vol. 117, 11, 2017.

The invention claimed is:

1. An apparatus for localizing single fluorescent molecules comprised in a sample using single molecule localization microscopy, the apparatus comprising:
a scanning unit configured to scan the sample using a light beam at a first wavelength having a predetermined irradiance;
an image acquisition unit configured to acquire a first image and a second image at a second wavelength;
a localization unit configured to localize the single fluorescent molecules in the second image;
the apparatus comprises:
a determination unit configured to determine, based on the first image, one or more local densities of the single fluorescent molecules; and
a calculation unit configured to calculate one or more local irradiances of the light beam as a predetermined function of each one of the one or more local densities of the single fluorescent molecules,
wherein the scanning unit is further configured to scan the sample using the one or more local irradiances of the light beam.

2. An apparatus according to claim 1, wherein the one or more local irradiances of the light beam are adapted so that, in average, only one of the single fluorescent molecules emits in a given time frame in a given focal volume.

3. An apparatus according to claim 1, wherein the apparatus is configured to perform a series of successive processes for localizing the single fluorescent molecules, wherein, for each successive process, the second image becomes the first image of the successive process and the scanning unit is further configured to scan the sample using the one or more local irradiances calculated based on the one of the one or more local densities determined from the second image.

4. An apparatus according to claim 1, wherein the calculation unit is configured to calculate the one or more local irradiances based on a look-up table in which local irradiance values are associated with local density of fluorescent molecules values.

5. An apparatus according to claim 1, wherein the scanning unit comprises a zoom for varying the local irradiance of the light beam by varying its diameter.

6. An apparatus according to claim 1, wherein the determination unit is configured to determine a trajectory of the light beam, and the scanning unit is configured to scan the sample based on the trajectory, wherein the trajectory includes regions of the sample comprising the single fluorescent molecules and avoids regions of the sample which do not comprise the single fluorescent molecules.

7. A method of localizing single fluorescent molecules comprised in a sample using single molecule localization microscopy, the method comprising:

a) scanning the sample using a light beam at a first wavelength having a predetermined irradiance, said first wavelength being an excitation wavelength of said fluorescent molecules;
b) acquiring a first image at a second wavelength, said second wavelength being an emission wavelength of said fluorescent molecules;
c) determining, based on the first image, one or more local densities of the single fluorescent molecules;
d) calculating, one or more local irradiances of the light beam as a predetermined function of each one of the one or more local densities of the single fluorescent molecules;
d) scanning the sample using the one or more local irradiances of the light beam;
f) acquiring a second image at the second wavelength; and
g) localizing the single fluorescent molecules in the second image.

8. A method according to claim 7, wherein the one or more local irradiances of the light beam are adapted so that, in average, only one of the single fluorescent molecules emits in a given time frame in a given focal volume.

9. A method according to claim 7, wherein the steps c) to g) are performed successively multiple times and wherein the second image becomes the first image of step c) and successive second images are obtained each successive time the steps are performed, wherein the process further comprising scanning the sample using the one or more local irradiances calculated based on the one of the one or more local densities determined from the second image.

10. A method according to claim 7, wherein the one or more local irradiances are calculated based on a look-up table in which local irradiance values are associated with local density of fluorescent molecules values.

11. A method according to claim 7, wherein scanning the sample using the one or more local irradiances of the light beam includes varying the local irradiance of the light beam by varying its diameter.

12. A method according to claim 7, wherein the method comprises determining a trajectory of the light beam and scanning the sample based on the trajectory, wherein the trajectory includes regions of the sample comprising the single fluorescent molecules and avoids regions of the sample which do not comprise the single fluorescent molecules.

13. A method according to claim 9, wherein the method further comprises reconstructing a final image of the single fluorescent molecules based on the localization of the single the single fluorescent molecules in the second image and the each successive second image.

* * * * *